April 13, 1965  J. ROSSEZ  3,177,998
MAGNETIC CLUTCH WITH A MAGNETIC LINING
Filed Jan. 15, 1963
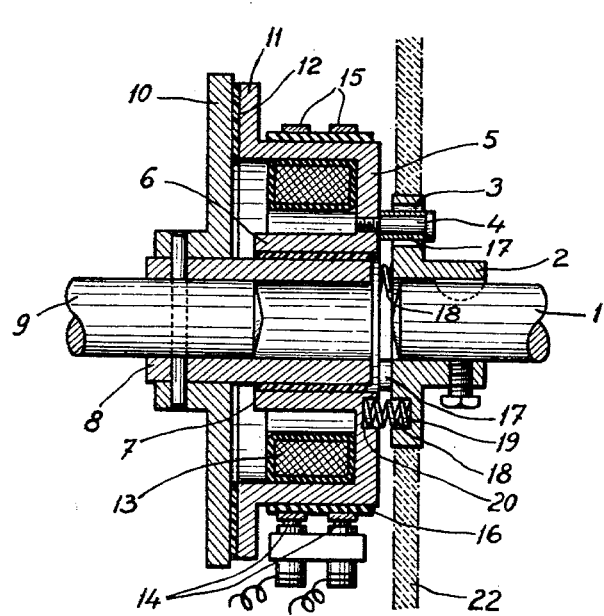

United States Patent Office 3,177,998
Patented Apr. 13, 1965

3,177,998
MAGNETIC CLUTCH WITH A MAGNETIC LINING
Jean Rossez, Paris, France, assignor to Compagnie des Machines Bull (Societe Anonyme), Paris, France
Filed Jan. 15, 1963, Ser. No. 251,650
Claims priority, application France, Jan. 19, 1962, 885,325, Patent 1,319,438
3 Claims. (Cl. 192—84)

This invention relates to magnetic friction material having high magnetic permeability and satisfactory resistance to friction, and packings formed from such material, the invention being concerned also with apparatus employing such magnetic packings.

A magnetic friction packing according to the invention may be employed in the construction of bearings, abutments, brake or clutch linings or other mechanical friction elements through which a magnetic field may be at least partially passed and which for this purpose must have high magnetic permeability and must be resistant to friction.

A magnetic friction packing may be produced in accordance with the invention by sintering a mixture of polytetrafluoroethylene powder and iron powder of particular structure, mixed in predetermined proportions and sintered by a known method.

It is known to produce bearings, abutments and other mechanical friction members with so-called self-lubricating materials obtained by sintering a mixture of polytetrafluoroethylene powder and of ferrous or non-ferrous metal powder. Depending upon the applications envisaged, the proportion of metal in these known devices may vary from 0.1% to 30% by volume in the mixture. The products thus obtained have good resistance to friction and may be welded to a metal surface by known industrial methods, but, even when they incorporate 30% of iron, linings prepared by this method have not sufficient magnetic permeability to enable them to be advantageously employed in the production of, for example, magnetic brakes or clutches.

A magnetic friction packing according to an example of the invention is produced from a mixture of polytetrafluoroethylene and iron, containing more than 70% of iron by volume. The product obtained after sintering has high permeability, which varies in accordance with the iron content, and good resistance to friction, and may be welded to a metal surface by known industrial methods. This result is obtained by mixing with polytetrafluoroethylene, also called PTFE, an iron powder of particular structure which consists of about 65% by volume of iron having a particle size in the neighbourhood of 100 microns, for example of an iron powder currently employed in the production of welding electrodes, on the one hand, and of about 35% by volume of iron powder having a particle size of less than 5 microns, on the other hand. This powder may be obtained, for example, from iron carbonyl, such as the powders already employed in the manufacture of magnetic circuits for high frequencies. The addition of this second powder provides a remarkable iron packing degree which considerably improves the magnetic permeability and the frictional resistance of a material obtained from this mixture.

A magnetic friction packing produced in accordance with the invention and welded to a metal surface (generally iron or soft steel) so adheres to the said surface as to make it possible to produce by machining magnetic packings having a thickness of less than 0.3 mm. Under these conditions, a magnetic friction packing thus produced may be regarded as having in the majority of cases a reluctance lower than the reluctance of the remainder of the magnetic circuit of which it forms part, and on the other hand the high metal content of the packing, added to its small thickness, imparts to the said packing a high thermal conductivity which facilitates the evacuation, through the packing, of some of the heat produced by friction at the level of the friction surfaces, despite the low thermal conductivity of the PTFE employed in the mixture. Under normal conditions of use, the coefficient of friction of a magnetic friction packing of this type may vary from 0.04 to 0.7, depending upon the conditions of pressure, temperature and relative speed of the surfaces in frictional engagement. In the event of a considerable overload, there may be produced at the level of the friction surfaces hot points which reach a critical temperature for the PTFE. Under these conditions, the packing behaves as a bearing self-lubricated with PTFE, that is to say, the overheated part is automatically lubricated by the exudation of PTFE, which eliminates the danger of binding or seizing.

After some period of service, it is sometimes found that the material becomes somewhat compressed, with the result that the magnetic permeability of the packing is slightly increased. With iron powders having the above-specified structure, it has been possible to produce magnetic friction packings with mixtures containing up to 85% by volume of iron, but above this percentage it is sometimes necessary to employ special methods for the welding, which proves more difficult.

The advantages of the magnetic friction packings thus produced will be more readily apparent on reference to the single figure of the accompanying drawing, which shows diagrammatically in section, merely by way of example, a coupling compring magnetic friction packings. As will hereinbefore be shown, the said coupling is also suitable for use as a clutch or as a magnetic brake.

The apparatus, considered as a magnetic clutch or coupling between two shafts comprises a driving shaft 1 assumed to be guided and rotated by means not shown. Mounted on the said shaft is a driving disc 2 keyed on the said shaft by appropriate means. The disc 2 is formed with holes 3 in which there are engaged coupling dogs 4 fast with an engagement drum 5 which comprises a sleeve 6 internally lined by a welded magnetic friction packing 7, which forms a bearing on a hollow trunnion 8 fast with a shaft 9 called the driven shaft (in the case of a clutch). The drum 5 is provided with a flange 11 lined by a welded magnetic friction packing 12. Disposed in the drum 5 is a magnetic energising coil 13. The electric energising current is fed to the said coil through two fixed brushes 14, which may be connected to a current source and which rub on contact rings 15 fast with the drum and insulated therefrom by an insulating lining 16. The said contact rings are electrically connected to the ends of the coil 13 by electric conductors not shown. The coupling dogs 4 are each provided with a bush 17 of resilient material which is intended to absorb any vibrations of the coupling. Springs 18 partly let into recesses 19 and 20 push the flange 11 of the drum against a disc 10 fast with the hollow trunnion 8 and with the driven shaft 9.

In the absence of electric current in the coil 13, the magnetic packing 12 is slightly applied against the disc 10 by the springs 18, as has been described in the foregoing. When the driving shaft 1 is rotating and the shaft 9 is loaded, the magnetic packing 12 fast with the flange 11 rubs against the disc 10, which is fixed, but the friction forces set up are are very small.

If the coil 13 is energised by a direct current of appropriate value, a magnetic field is set up through the drum 5, the sleeve 6, the magnetic bearing packing 7, the hollow trunnion 8, the disc 10, the magnetic friction packing 12 and the flange 11 of the drum 5, all these parts, except the magnetic packings, consisting of iron or soft steel. Under the action of the magnetic field, the magnetic packing 12 is strongly gripped between the flange 11 and the disc 10. When the drum 5 is rotating, the disc 10 is driven in the direction of rotation thereof by a torque which is a function of the pressure exerted on the friction surfaces and a function of the coefficient of friction of the latter. For the transmission of high torques, it will be advantageous to make the friction surface and the pressure due to the magnetic attraction on the magnetic packing such that the said pressure is higher than, for example, 10 kilogrammes per square centimetre. In addition, it is obvious that the magnetic packing 7 forming a bearing works under different conditions from the magnetic packing welded to the flange 11, which are such that its coefficient of friction is much lower.

As has been stated in the foregoing, a device of this type may also be employed as a brake. In this case, the driving disc 2 is fixed and may therefore be replaced by a fixed plate 22, as illustrated in chain lines in the figure. In a modified form, the disc 10 could also be regarded as fixed so as to brake or stop the shaft 1, but it is generally advantageous to minimise the mass of the members which are to undergo variations of movement.

A magnetic clutch provided with magnetic friction packings such as that just described by way of a practical example affords certain advantages over the known devices, simply by reason of the use of magnetic friction packings:

(1) The low reluctance of the packings inserted in the magnetic circuit makes it possible to obtain more intense magnetic fields for the same expenditure of current than when air gaps are employed in the magnetic circuit.

(2) Owing to the fact that the friction surfaces are maintained permanently in contact, their relative movement towards one another at the instant when the magnetic field is set up is completely eliminated, and the response time is thus reduced.

(3) Avoidance of air-gap adjustments, the friction surfaces being maintained in contact by springs which automatically take up even the most minute wear produced by the grinding of the surfaces when they are initially put into operation.

(4) Avoidance of binding, the hot points being automatically lubricated. This advantage makes it possible to use a device of the type described as a clutch, a brake or a torque limiter. The magnetic clutch of the type described has many advantages over clutches employing dry magnetic powder or magnetic powder in suspension in oil or in a deformable material. In such clutches, the action of the centrifugal inertia forces of the magnetic powder and the variations of the distribution of the powder in the air gaps opposes the normal magnetic forces. It is obvious that magnetic friction packings as hereinbefore described may be employed, for example, to line the friction surfaces of magnetic clutches of gear-boxes for automobile vehicles, and may have any forms considered suitable in accordance with the circumstances and application.

I claim:

1. A magnetically operated friction clutch comprising a first rotating shaft, a second shaft having a flanged member co-axial with said first shaft, an intermediate member with a flange surface facing said flanged member, said intermediate member being axially displaceable and concentric to the axis of said first shaft, the flange surface of said intermediate member being fitted with a flat lining of a magnetic friction packing composed of a mixture of polytetrafluorethylene and ferrous powder, welded to said flange surface, means to substantially prevent any angular movement of said intermediate member with respect to said first shaft, urging means adapted to apply the lining face of said intermediate member against the flanged member of said second shaft and to maintain said lining face in constant engagement with the flanged member of said second shaft producing a friction insufficient to drive said second shaft into rotation, an electromagnet coil adapted to produce when energized, a magnetic field in said flanged member and in the flange of said intermediate member, the relatively low reluctance of said lining permitting a strong magnetic flux to pass through said flanges and frictionally coupling them.

2. A magnetically operated friction clutch according to claim 1 wherein said urging means adapted to apply the lining face of the intermediate member against the flanged member of said second shaft are constituted by a plurality of springs.

3. A friction clutch according to claim 1, wherein the lining of magnetic friction packing welded to the flange surface of said intermediate member has a thickness not greater than 0.3 millimeter.

References Cited by the Examiner

UNITED STATES PATENTS

| 2,464,437 | 3/49 | Dasher. |
| 2,580,869 | 1/52 | Winther. |
| 2,966,737 | 1/61 | Spokes et al. |
| 3,037,860 | 6/62 | Masterson et al. |

FOREIGN PATENTS

| 757,954 | 9/56 | Great Britain. |

DAVID J. WILLIAMOWSKY, *Primary Examiner.*